United States Patent
Davila et al.

(10) Patent No.: US 11,023,885 B2
(45) Date of Patent: Jun. 1, 2021

(54) SYSTEM, METHOD, AND COMPUTER PROGRAM FOR SECURELY TRANSMITTING AND PRESENTING PAYMENT CARD DATA IN A WEB CLIENT

(71) Applicant: Marqeta, Inc., Oakland, CA (US)

(72) Inventors: Anaximandro A. Davila, San Francisco, CA (US); Daniel Osburn, Emeryville, CA (US); Anthony Ford, Pittsburg, CA (US); David Matter, Mill Valley, CA (US)

(73) Assignee: Marqeta, Inc., Oakland, CA (US)

( * ) Notice: Subject to any disclaimer, the term of this patent is extended or adjusted under 35 U.S.C. 154(b) by 313 days.

(21) Appl. No.: 15/640,325

(22) Filed: Jun. 30, 2017

(65) Prior Publication Data

US 2019/0005489 A1    Jan. 3, 2019

(51) Int. Cl.
*G06Q 20/04* (2012.01)
*G06Q 20/34* (2012.01)
*G06Q 20/08* (2012.01)
*G06Q 20/12* (2012.01)

(52) U.S. Cl.
CPC .......... *G06Q 20/356* (2013.01); *G06Q 20/04* (2013.01); *G06Q 20/085* (2013.01); *G06Q 20/12* (2013.01)

(58) Field of Classification Search
None
See application file for complete search history.

(56) References Cited

U.S. PATENT DOCUMENTS

| | | | |
|---|---|---|---|
| 6,044,360 A | 3/2000 | Picciallo | |
| 6,931,382 B2 | 8/2005 | Laage et al. | |
| 7,318,048 B1 * | 1/2008 | King | G06Q 20/02 705/39 |
| 7,664,405 B2 | 2/2010 | Paulson | |

(Continued)

FOREIGN PATENT DOCUMENTS

| | | |
|---|---|---|
| WO | 01041026 | 6/2001 |
| WO | 02097752 | 12/2002 |

OTHER PUBLICATIONS

Li, Yingjiu, et al., "A Security-Enhanced One-Time Payment Scheme for Credit Card", Mar. 2004.

(Continued)

*Primary Examiner* — William J Jacob
(74) *Attorney, Agent, or Firm* — Baker Botts L.L.P.

(57) ABSTRACT

The present disclosure relates to a system, method, and computer program for securely transmitting and presenting payment card data in a web client. Payment card information is securely transmitted form a payment card server to a sandboxed container object on a webpage. The payment card sever is PCI compliant and independent of the webserver that provided the webpage to the web client. A sandboxed payment-card client, executing within the sandboxed container object on the web page, establishes a secure communication session with the payment-card sever. The payment-card server transmits payment card data to the sandboxed payment-card client, which displays the payment card data in the sandboxed container object (or in a plurality of sandboxed container objects). The website's webserver is bypassed in communications between the payment-card server and the sandboxed payment-card client.

15 Claims, 8 Drawing Sheets

(56) References Cited

U.S. PATENT DOCUMENTS

| | | | |
|---|---|---|---|
| 7,664,705 | B2 | 2/2010 | Walker et al. |
| 7,877,297 | B2 | 1/2011 | Gould et al. |
| 7,921,299 | B1* | 4/2011 | Anantha ................ G06F 21/53 |
| | | | 705/51 |
| 8,191,766 | B2 | 6/2012 | Tomchek et al. |
| 8,249,985 | B2 | 8/2012 | Giordano et al. |
| 8,290,866 | B1 | 10/2012 | Little |
| 8,341,076 | B1 | 12/2012 | Wilkes |
| 8,442,914 | B2 | 5/2013 | Killian et al. |
| 8,447,670 | B1 | 5/2013 | DeLoach |
| 8,583,496 | B2 | 11/2013 | Yoo et al. |
| 8,626,642 | B2 | 1/2014 | Foss et al. |
| 8,635,117 | B1 | 1/2014 | Acuna-Rohter |
| 9,613,358 | B1 | 4/2017 | Gardner |
| 9,767,457 | B1 | 9/2017 | Ford et al. |
| 10,026,089 | B2 | 7/2018 | Ford et al. |
| 2002/0002485 | A1 | 1/2002 | O'Brien et al. |
| 2002/0033416 | A1 | 3/2002 | Gerszberg et al. |
| 2002/0052948 | A1 | 5/2002 | Baudu et al. |
| 2002/0073045 | A1 | 6/2002 | Rubin et al. |
| 2002/0169720 | A1 | 11/2002 | Wilson et al. |
| 2003/0142664 | A1 | 7/2003 | Gerszberg et al. |
| 2003/0144894 | A1* | 7/2003 | Robertson ................ G06Q 20/00 |
| | | | 709/226 |
| 2004/0186773 | A1 | 9/2004 | George et al. |
| 2004/0205772 | A1* | 10/2004 | Uszok .................... H04L 29/06 |
| | | | 719/317 |
| 2005/0080634 | A1 | 4/2005 | Kanniainen et al. |
| 2006/0078099 | A1 | 4/2006 | Liebenow et al. |
| 2006/0190412 | A1 | 8/2006 | Ostroff |
| 2006/0212407 | A1 | 9/2006 | Lyon |
| 2006/0224454 | A1 | 10/2006 | Kantor et al. |
| 2006/0271496 | A1* | 11/2006 | Balasubramanian .. G06Q 20/04 |
| | | | 705/64 |
| 2007/0063017 | A1 | 3/2007 | Chen et al. |
| 2007/0112655 | A1 | 5/2007 | Jones |
| 2007/0130070 | A1* | 6/2007 | Williams ........... G06Q 30/0601 |
| | | | 705/50 |
| 2007/0284436 | A1 | 12/2007 | Gland |
| 2008/0077506 | A1 | 3/2008 | Rampell et al. |
| 2008/0208747 | A1 | 8/2008 | Papismedov et al. |
| 2009/0078755 | A1 | 3/2009 | Sullivan et al. |
| 2009/0164382 | A1 | 6/2009 | Sally |
| 2009/0171805 | A1 | 7/2009 | Gould et al. |
| 2009/0288012 | A1* | 11/2009 | Hertel .................. G06Q 20/326 |
| | | | 715/738 |
| 2009/0299841 | A1 | 12/2009 | Bishop et al. |
| 2010/0049599 | A1 | 2/2010 | Owen et al. |
| 2010/0057580 | A1 | 3/2010 | Raghunathan |
| 2010/0058156 | A1 | 3/2010 | Hardy-McGee |
| 2010/0094699 | A1 | 4/2010 | Beal |
| 2010/0301113 | A1 | 12/2010 | Bohn et al. |
| 2010/0312629 | A1 | 12/2010 | Wolf et al. |
| 2011/0047038 | A1 | 2/2011 | Halevi |
| 2011/0191209 | A1 | 8/2011 | Gould et al. |
| 2012/0011063 | A1 | 1/2012 | Killian et al. |
| 2012/0130787 | A1 | 5/2012 | Stouffer et al. |
| 2012/0173348 | A1 | 7/2012 | Yoo et al. |
| 2012/0215605 | A1 | 8/2012 | Gardner et al. |
| 2012/0253852 | A1 | 10/2012 | Pourfallah et al. |
| 2012/0330840 | A1 | 12/2012 | Stinchcombe |
| 2013/0065564 | A1 | 3/2013 | Conner et al. |
| 2013/0262307 | A1 | 10/2013 | Fasoli et al. |
| 2013/0262313 | A1 | 10/2013 | Martin et al. |
| 2013/0282565 | A1 | 10/2013 | Barta et al. |
| 2013/0290184 | A1 | 10/2013 | Shapiro et al. |
| 2013/0318348 | A1 | 11/2013 | Lebron et al. |
| 2014/0040129 | A1 | 2/2014 | Akin |
| 2014/0096261 | A1* | 4/2014 | Boldyrev ............ G06F 21/6263 |
| | | | 726/26 |
| 2015/0127457 | A1* | 5/2015 | Feldman ............ G06Q 30/0255 |
| | | | 705/14.53 |
| 2015/0199674 | A1* | 7/2015 | Kaplinger ............ G06Q 20/322 |
| | | | 705/44 |
| 2015/0363771 | A1 | 12/2015 | Graylin et al. |
| 2017/0116597 | A1* | 4/2017 | Bargagli ............ G06Q 20/4014 |
| 2017/0213218 | A1* | 7/2017 | Pickering ............ G06K 19/145 |
| 2018/0176192 | A1* | 6/2018 | Davis .................... H04L 9/3247 |

OTHER PUBLICATIONS

PCT International Search Report and Written Opinion in PCT/US2017/062364, 12 pages, dated Feb. 28, 2018.

International Preliminary Report on Patentability in PCT/US2017/062364, 20 pages, dated Oct. 9, 2019.

* cited by examiner

ND COMPUTER
SYSTEM, METHOD, AND COMPUTER PROGRAM FOR SECURELY TRANSMITTING AND PRESENTING PAYMENT CARD DATA IN A WEB CLIENT

BACKGROUND OF THE INVENTION

1. Field of the Invention

This invention relates generally to a payment card system and, more particularly, to a system and method for securely transmitting and presenting payment card data on a website.

2. Description of the Background Art

Virtual and electronic payment cards are becoming increasingly more popular. Users often apply for and receive virtual or electronic payment card information online, and some websites provide such payment cards on demand.

Payment card information, such as the card number, expiration date, and card validation value (CVV) code, must be transmitted and displayed in accordance with Payment Card Industry (PCI) standards. Many businesses want to be able to display virtual or electronic payment cards on their website on demand, but prefer to do so without having to worry about PCI compliance, which is expensive to implement. This is especially the case for businesses that offer a branded payment card provided by a third-party. Therefore, there is demand for a solution that enables payment card data to be transmitted and displayed on a website without requiring the website's webserver to be PCI-compliant.

SUMMARY OF THE DISCLOSURE

The present disclosure relates to a system, method, and computer program for securely transmitting and presenting payment card data in a web client. Payment card information is securely transmitted form a payment card server to a sandboxed container object on a webpage. The payment card sever is PCI compliant and independent of the webserver that provided the webpage to the web client. In one embodiment, the sandboxed container object is a frame whose source attribute targets the payment card server.

A sandboxed payment-card client application, executing within the sandboxed container object on the web page, establishes a secure communication session with the payment-card sever. The payment-card server transmits payment card data to the sandboxed payment-card client, which displays the payment card data in the sandboxed container object (or in a plurality of sandboxed container objects). The website's webserver is bypassed in communications between the payment-card server and the sandboxed payment-card client. Payment card data cannot be accessed by webpage objects outside the sandboxed container object.

DETAILED DESCRIPTION OF THE PREFERRED EMBODIMENTS

The present disclosure relates to a system, method, and computer program for securely transmitting and presenting payment card data in a web browser. As described in more detail below, payment card information is securely transmitted from a payment card server, which is PCI compliant and independent of the website's webserver, to a sandboxed container environment on a webpage. The methods disclosed herein provide a solution for how to transmit payment card data in a PCI-compliant manner without requiring the webserver serving the applicable website to be PCI-compliant.

As used herein, a "payment card" may be any physical, electronic, or virtual credit, debit, or prepaid payment account or device that can be used to purchase goods or services (e.g., a plastic or virtual debit card, credit card, or prepaid card). A "web client" is a software application, such as a web browser, executing on a client computing device (e.g., personal computer, smart phone, etc.) that enables a user to view and navigate websites. A "webserver" is a server that provides webpages for a website to a web client. A "payment-card server" is a server that is able to transmit payment card data in accordance with payment card industry requirements (e.g., PCI compliant). A payment-card server is independent of webservers that provide webpages to web clients, and a payment-card sever may provide virtual or electronic payment cards (or other payment card information) to many different and unrelated websites.

Figure 1A:
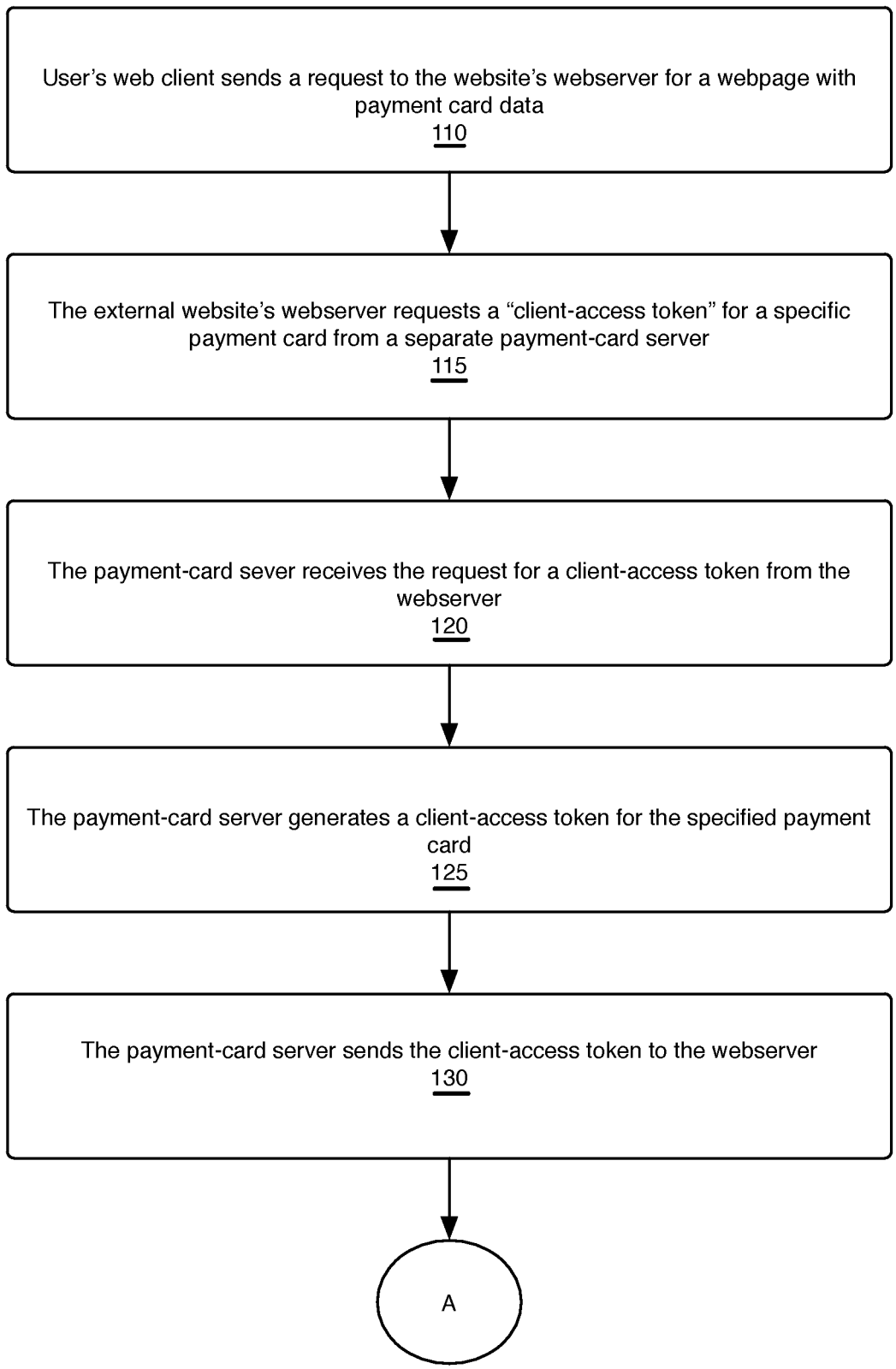
FIGS. 1A-D are flowcharts that illustrates a method, according to one embodiment of the disclosure, for securely transmitting payment card information to an external website from a payment-card server that is separate from and independent of the external website's webserver.
Figure 1B:
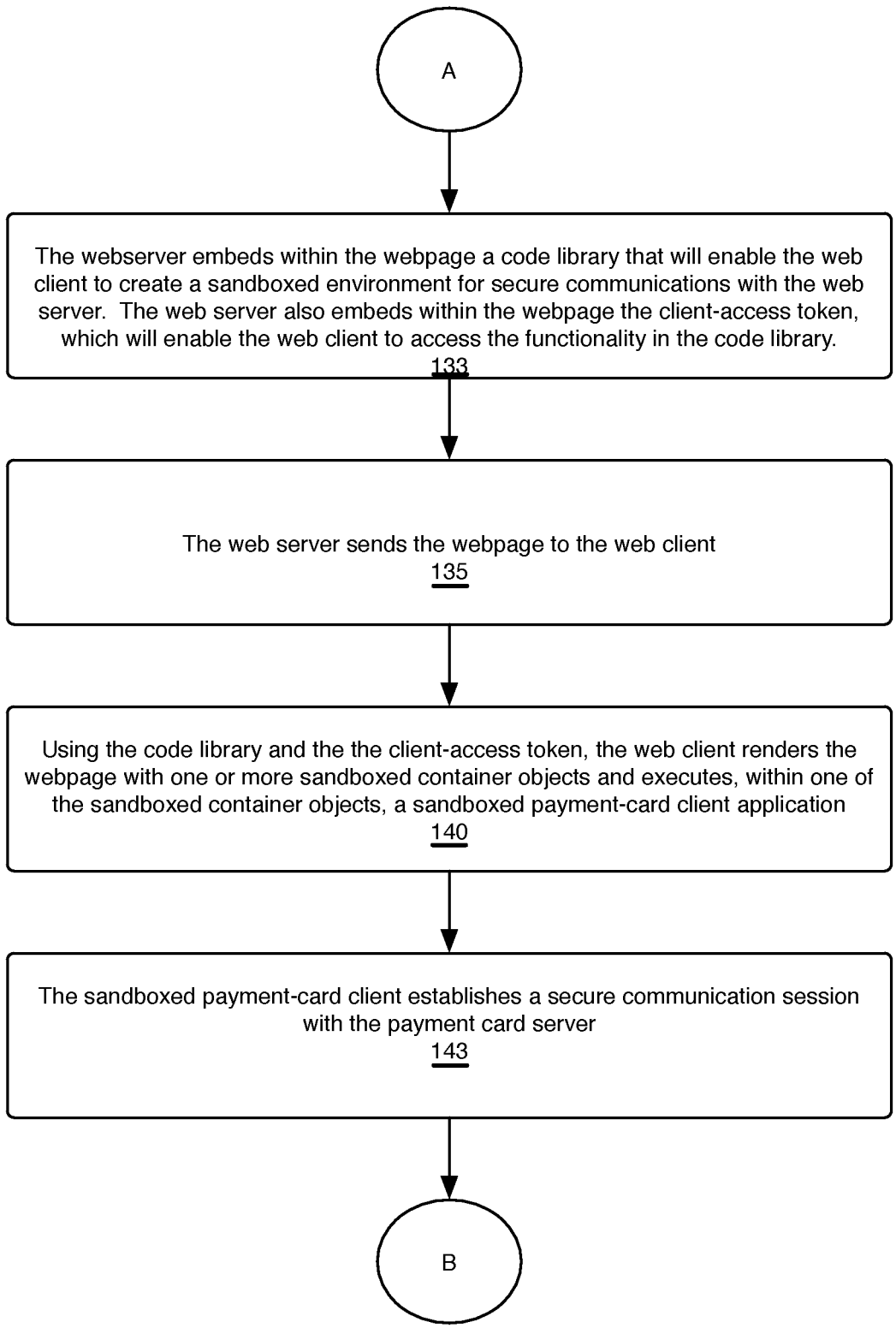
Figure 1C:
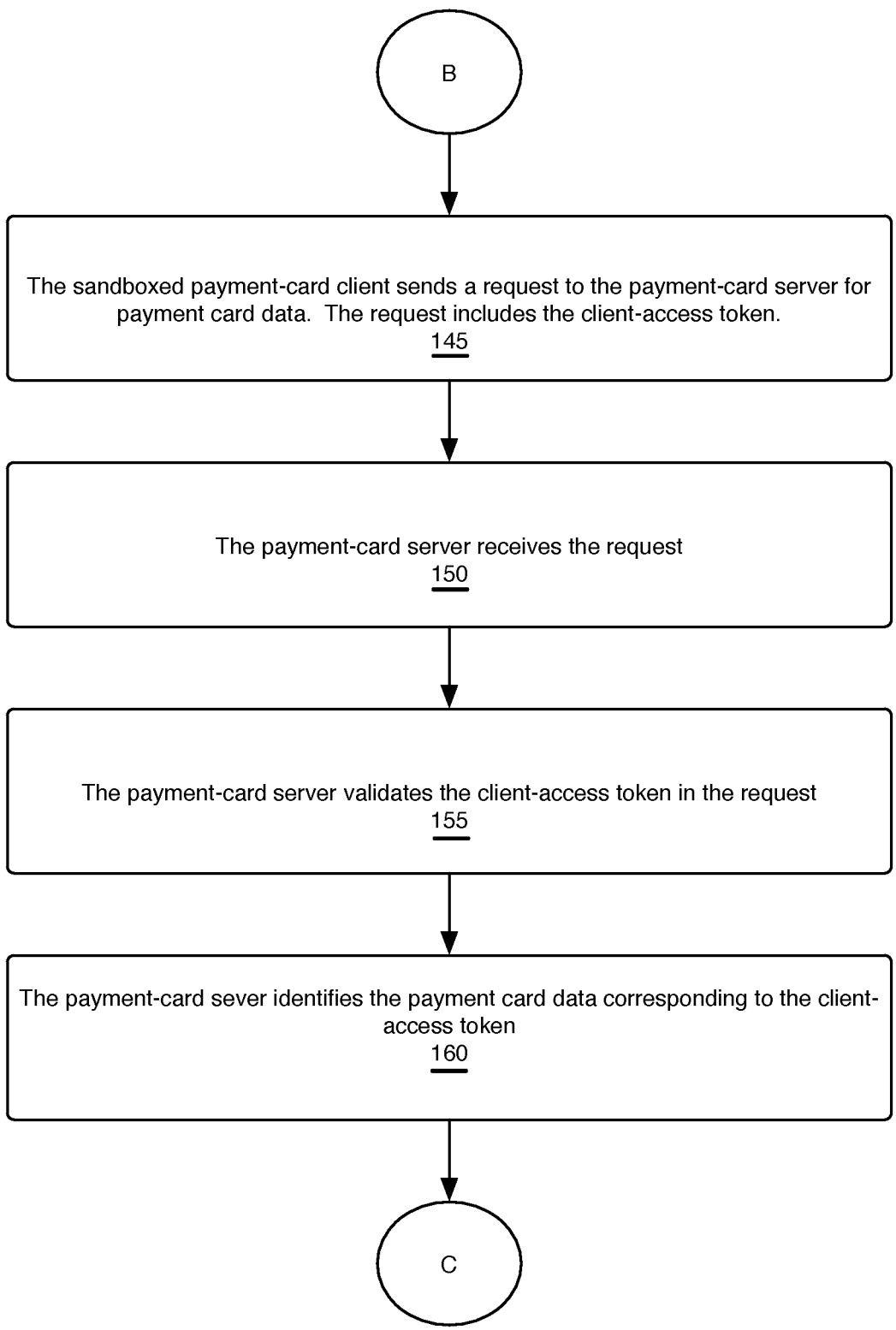
Figure 1D:
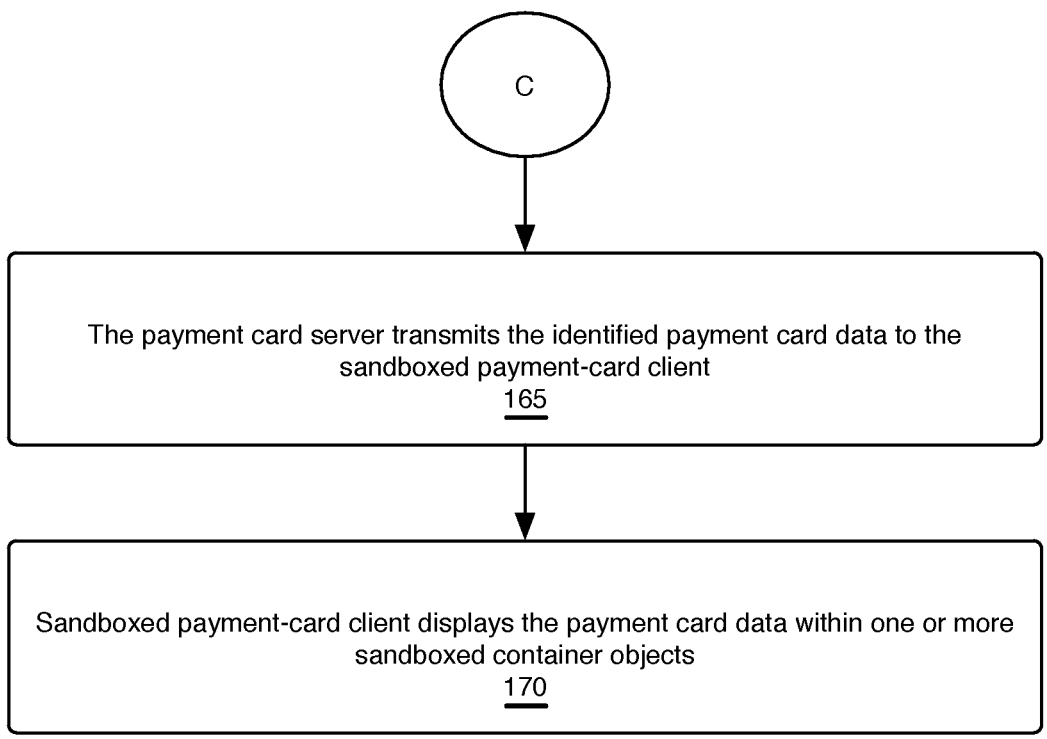
Figure 2:
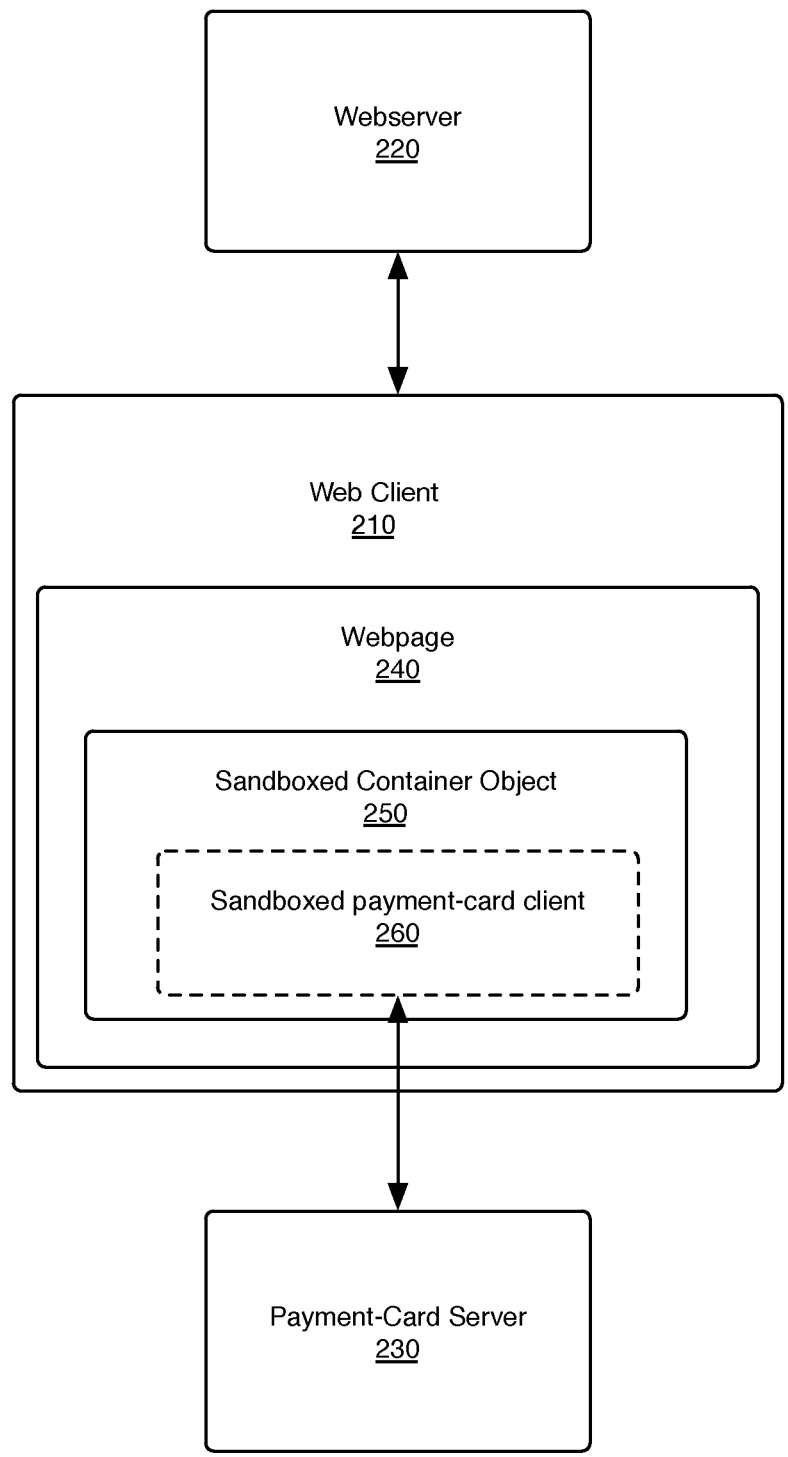
FIG. 2 is a diagram of a network that includes a client computing device with a web client, a webserver, and payment-card sever.

FIGS. 1A-1D illustrate a method for securely transmitting payment card information to an external website from a payment-card server that is separate from and independent of the external website's webserver. The website is referred to herein as the "external website" to emphasize that the website's webserver is not the payment-card server (and therefore it is "external" to the payment-card server). The method of FIGS. 1A-1D is described with respect to the network diagram in FIG. 2. Web client 210, webserver 220, and payment-card server 230 illustrated in FIG. 2 are examples of the web client, web server, and payment card server referenced in the description of FIGS. 1A-1D (as well as FIGS. 3A-3C). The steps of FIGS. 1A-1D are described in more detail below.

When a user of an external website that displays payment card data navigates to a page in which the payment card data is to be displayed, the user's web client (e.g., web client 210) sends a request to the website's webserver (e.g., webserver 220) for a webpage with the payment card data (step 110). Before responding to the web client with the webpage, the external website's webserver initiates a process that will enable a separate payment card server to securely transmit payment card data directly to the web client. Specifically, the external website's webserver requests a "client-access token" for a specific payment card from a separate payment-card server (e.g., payment card server 230) (step 115). As discussed in more detail below, a client-access token comprises: (1) a passcode or key that enable the web client to execute software that will enable the web client to receive and display payment card data from the payment-card server within a sandboxed container environment and (2) a card identifier that uniquely identifies a specific payment card account. The card identifier is not the payment card number itself (i.e., it not the primary account number (PAN) used to process purchase transactions). The card identifier is an identifier than enables the payment card server to retrieve the corresponding payment card account information (e.g., PAN, CVV, and expiration date).

The payment-card server receives the request for client-access token from the external website's webserver for the specified payment card (step 120). In response, the payment-card server generates a client-access token for the webserver for the specified payment card (step 125). In one embodiment, the client-access token expires after a period of time (e.g., 5 minutes).

The payment-card server sends the client-access token to the webserver (step 130). The webserver then embeds the client-access token within the requested webpage. The webserver also embeds a code library (e.g., a JavaScript library) that includes software that enables the web client to establish a secure communication session with the payment card server within a sandboxed container environment (step 133). The client-access token is required input for such code within the library (e.g., see discussion of FIGS. 3A-3C).

The webserver responds to the web client with the webpage (e.g., webpage 240) (step 135). In rendering the requested webpage, the web client uses the client-access token to execute code in the code library. This results in the web client creating one or more sandboxed container objects (e.g., object 250) on the webpage and executing, within one of the sandboxed container objects, a sandboxed payment-card client application (the "sandboxed payment-card client") (e.g., application 260) (step 140), which is a software module capable of establishing a communication session, based on transport layer encryption, with the payment-card server.

In one embodiment, a sandboxed container object is a frame object (e.g., an iContainer) whose source attribute targets the payment-card server. A sandboxed container object is "sandboxed" in that data within the container cannot be accessed by any webpage object outside the sandboxed container object. For example, payment card data displayed within the sandboxed container object cannot be accessed by the top window object of the external webpage.

The sandboxed payment-card client is served by the payment card server. The sandboxed payment-card client, executing within a sandboxed container object, establishes a secure communication session with the payment card server using transport layer encryption (step 143). The sandboxed payment-card client sends a request to the payment-card server for payment card data, wherein the request includes the client-access token (step 145). The payment-card server receives the request (step 150), and it validates the client-access token in the request (step 155).

If the client-access token is valid, the payment-card server identifies the payment card data corresponding to the client-access token (i.e., corresponding to the card identifier in the client access token) (step 160). The payment-card server then transmits, using transport layer encryption, the identified payment card information to the sandboxed payment-card client executed by the web client (step 165). The external website's webserver is bypassed in this step. The payment card information is sent directly from the payment-card server to the sandboxed payment-card client executing within the sandboxed container object on the external webpage, and, therefore, there is no need for the webserver to be PCI compliant.

The sandboxed payment-card client receives the payment card data and displays the payment card data within one or more sandboxed container objects (step 170). In one embodiment, the payment card data is displayed within a single sandboxed container object. In an alternate embodiment, multiple sandboxed container objects are created in step 140, and there are separate container objects for the card number, expiration date, and card validation value (CVV). In this alternate embodiment, the sandboxed payment-card client in one of the sandboxed container objects handles the communications with the payment-card server and distributes the applicable payment card data to the other sandboxed container objects.

The above method enables payment card data to be delivered "on demand," as the web client request triggers the above flow. The payment card data is handled by the payment-card server and the sandboxed payment-card client in accordance with applicable PCI standards.

Figure 3A:
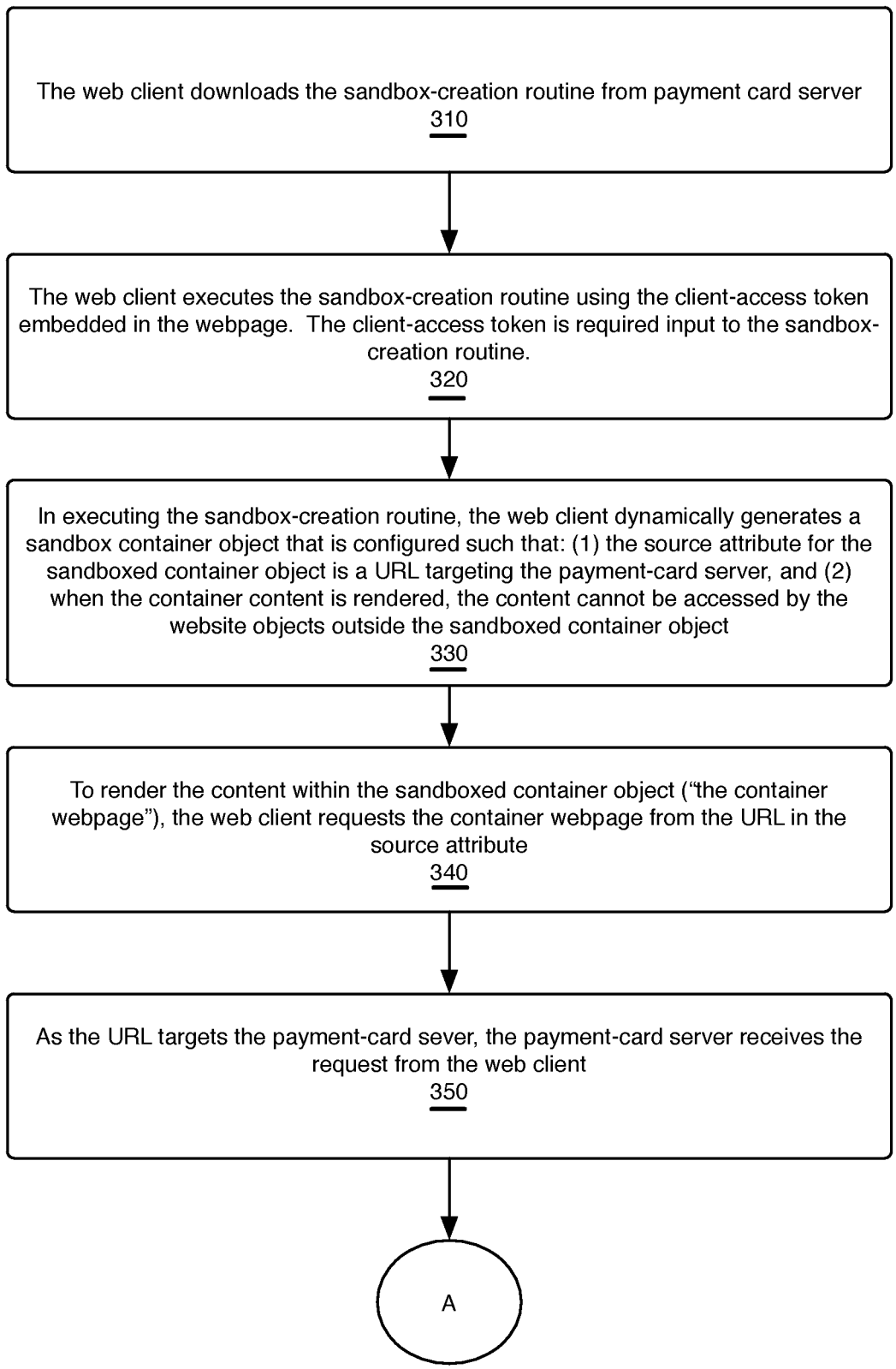
FIGS. 3A-3C are flowcharts that illustrate a method, according to one embodiment of the disclosure, for creating a sandboxed container object and for executing a sandboxed payment-card client within the sandboxed container object.
Figure 3B:
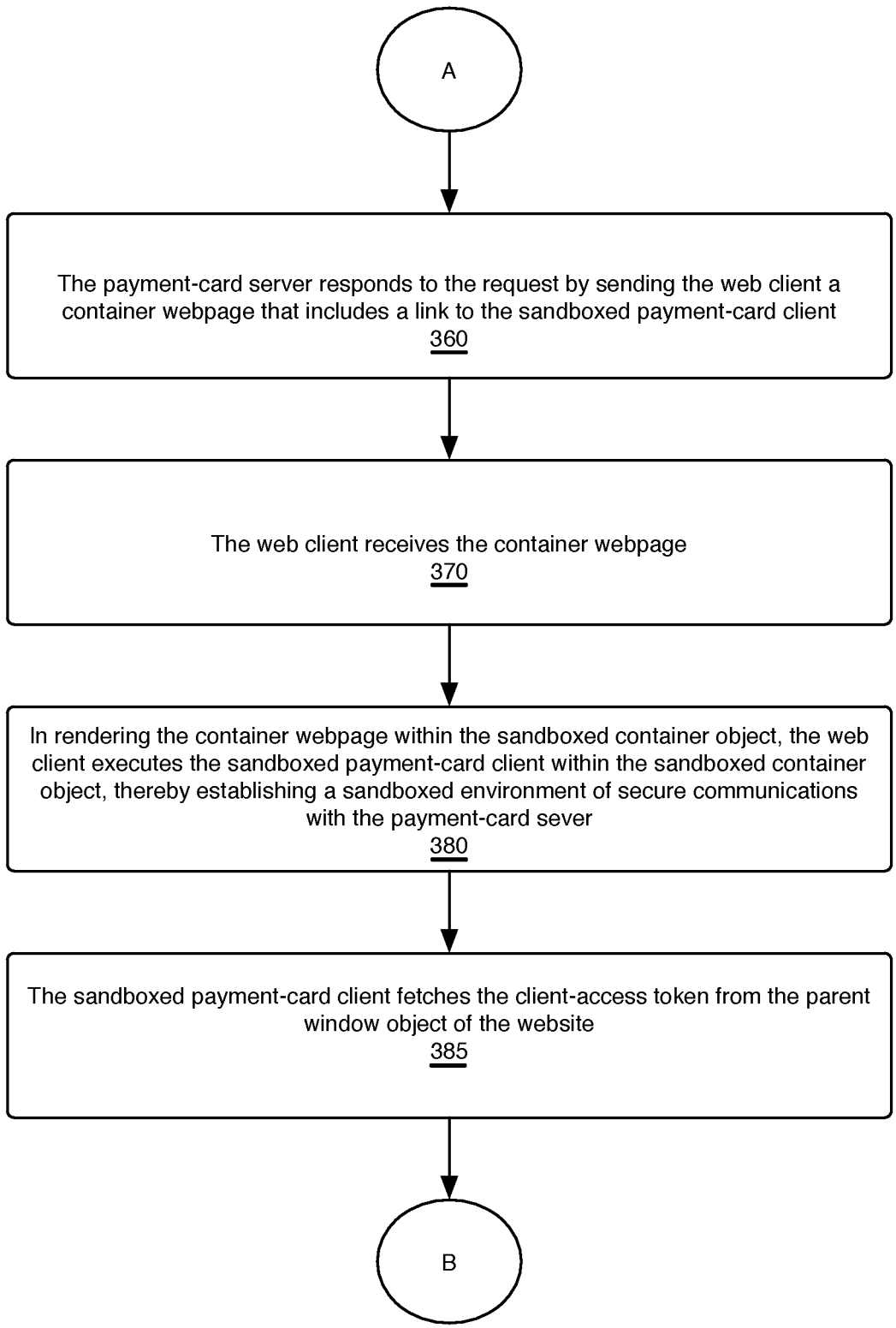
Figure 3C:
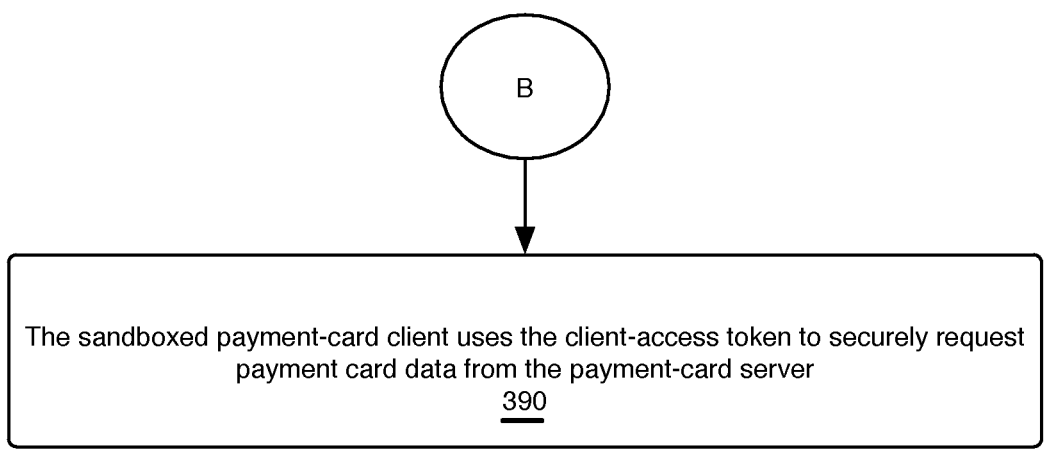

FIGS. 3A-3C illustrate how the web client creates the sandboxed container object and executes the sandboxed payment-card client (e.g., how the web client performs step 140 in FIG. 1B) according to one embodiment. In this embodiment, the library included in the webpage in step 135 above includes a link to a sandbox-creation software routine (the "sandbox-creation routine"), which is hosted on the payment-card server.

As part of rendering the webpage in step 140, the web client downloads the sandbox-creation routine from payment-card server (step 310), and executes the sandbox-creation routine using the client-access token embedded in the webpage (step 320). The client-access token is required input to the sandbox-creation routine, as it includes a passcode/key that enables the web client to executed the sandbox-creation routine.

When the web client initiates execution of the sandbox-creation routine, the sandbox-creation routine dynamically generates a sandboxed container object that is configured such that: (1) the source attribute for the sandboxed container object is a URL targeting the payment-card server, and (2) when the container content is rendered, the content cannot be accessed by website objects outside the sandboxed container object (step 330).

To render the content within the sandboxed container object (the content referred to herein as the "container webpage"), the web client requests the container webpage from the URL in the source attribute (step 340). As the URL targets the payment-card server, the payment-card server receives the request (step 350).

The payment-card server responds to the request by sending the web client a container webpage that includes a link to the sandboxed payment-card client (step 360).

The web client receives the container webpage (step 370), and as part of rendering the container webpage within the sandboxed container object, the web client downloads and executes the sandboxed payment-card client within the sandboxed container object (step 380), thereby establishing a sandboxed environment for secure communication with the payment card sever. The sandboxed payment-card client then securely fetches the client-access token from the parent window object of the external website (step 385), and uses the client-access token to securely request payment card data from the payment-card server (step 390), as set forth in step 145 above.

The methods described with respect to FIGS. 1-3 are embodied in software and performed by computers executing the software (e.g., a client computing device, the webserver, and the payment-card server). A person skilled in the art would understand that a computer system has one or more memory units, disks, or other physical, computer-readable storage media for storing software instructions, as well as one or more processors for executing the software instructions. The term "application" herein refers to a software code.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for transmitting payment card information to an external website from a payment-card server that is separate from a webserver that serves the external website, the method comprising:

receiving a request at a payment-card server to display payment card information on an external website, wherein the request is sent by the external website's webserver that serves the web site;

responding to the request by sending a client-access token from the payment-card server to the external website's web server, wherein the client-access token enables a web client that displays the external website to: (1) generate, within the external website, a sandboxed container object that has a source attribute that targets the payment-card server, and (2) execute a sandboxed payment-card client application within the sandboxed container object that communicates with the payment-card server;

the web client being configured to render content within the sandboxed container object by downloading a sandbox-creation routine from the payment-card server, executing the sandbox-creation routine using the client-access token as required input, the sandbox-creation routine being configured to dynamically generate a sandboxed container object being configured with a URL targeting the payment-card server as the source attribute, and requesting the content from the payment-card server via the URL and receiving the content that includes a link to a sandboxed payment-card client application;

receiving a request at the payment-card server for payment card information from the sandboxed payment-card client application executed by the web client, wherein the request includes the client-access token;

identifying at the payment-card server payment card information corresponding to the client-access token; and transmitting the payment card information from the payment-card server directly to the sandboxed payment-card client application in the external website, wherein the external website's webserver is bypassed in the communications between the payment-card server and the sandboxed payment-card client application.

2. The method of claim 1, further comprising:

displaying by the sandboxed payment-card client application the payment card information within the sandboxed container object.

3. The method of claim 2, wherein the sandboxed payment-card client application distributes the payment card information among a plurality of sandboxed container objects.

4. The method of claim 1, wherein the client-access token includes an identifier that is associated with a specific payment card, wherein the identifier is different from a primary account number for the specific payment card.

5. A payment-card system for securely transmitting payment card information to an external website, the system comprising:

one or more processors;

one or more memory units coupled to the one or more processors, wherein the one or more memory units store instructions that, when executed by the one or more processors, cause the system to perform the operations of:

receiving a request to display payment card information on an external website, wherein the request is sent by the external website's webserver that serves the website;

responding to the request by sending a client-access token to the external website's webserver, wherein the client-access token enables a web client that displays the external website to: (1) generate, within the external website, a sandboxed container object that has a source attribute that targets the payment-card system, and (2) execute a sandboxed payment-card client application within the sandboxed container object that communicates with the payment-card server;

the web client being configured to render content within the sandboxed container object by downloading a sandbox-creation routine from the payment-card server, executing the sandbox-creation routine using the client-access token as required input, the sandbox-creation routine being configured to dynamically generate a sandboxed container object being configured with a URL targeting the payment-card server as the source attribute, and requesting the content from the payment-card server via the URL and receiving the content that includes a link to a sandboxed payment-card client application;

receiving a request for payment card information from the sandboxed payment-card client application executed by the web client, wherein the request includes the client-access token;

identifying payment card information corresponding to the client-access token; and transmitting the payment card information from the payment-card server directly to the sandboxed payment-card client application in the external website, wherein the external website's webserver is bypassed in the communications between the payment-card system and the sandboxed payment-card client application.

6. The system of claim 5, the operations performed by the system further comprising:

displaying by the sandboxed payment-card client application the payment card information within the sandboxed container object.

7. The system of claim 6, wherein the sandboxed payment-card client application distributes the payment card information among a plurality of sandboxed container objects.

8. The system of claim 5, wherein the client-access token includes an identifier that is associated with a specific payment card, wherein the identifier is different from a primary account number for the specific payment card.

9. A non-transitory, computer-readable medium comprising a computer program, that, when executed by a payment-card system, enables the payment-card system to perform the following method for securely transmitting payment card information to an external website, wherein the payment-card system is separate from a webserver that serves the external website, the method comprising:

receiving a request to display payment card information on an external website, wherein the request is sent by the external website's webserver that serves the website;

responding to the request by sending a client-access token to the external website's webserver, wherein the client-access token enables a web client that displays the external website to: (1) generate, within the external website, a sandboxed container object that has a source attribute that targets the payment-card server, and (2) execute a sandboxed payment-card client application within the sandboxed container object that communicates only with the payment-card server;

the web client being configured to render content within the sandboxed container object by downloading a sandbox-creation routine from the payment-card server, executing the sandbox-creation routine using the client-access token as required input, the sandbox-creation routine being configured to dynamically generate a sandboxed container object being configured with a URL targeting the payment-card server as the source attribute, and requesting the content from the payment-card server via the URL and receiving the content that includes a link to a sandboxed payment-card client application;

receiving a request for payment card information from the sandboxed payment-card client application executed by the web client, wherein the request includes the client-access token;

identifying payment card information corresponding to the client-access token; and transmitting the payment card information directly to the sandboxed payment-card client application in the external website, wherein the external website's webserver is bypassed in the communications between the payment-card system and the sandboxed payment-card client application.

10. The non-transitory computer-readable medium of claim 9, the method performed by the payment-card system further comprising:

displaying by the sandboxed payment-card client application the payment card information within the sandboxed container object.

11. The non-transitory computer-readable medium of claim 10, wherein the sandboxed payment-card client application distributes the payment card information among a plurality of sandboxed container objects.

12. The non-transitory computer-readable medium of claim 9, wherein the client-access token includes an identifier that is associated with a specific payment card, wherein the identifier is different from a primary account number for the specific payment card.

13. The method of claim 1, wherein, after responding with the client-access token and prior to receiving the request for payment card information from the sandboxed payment-card client application, the method further comprises:

receiving a request at the payment-card server from the web client for content for the sandboxed container object; and responding to the request at the payment-card server by providing the web client with the sandboxed payment-card client application.

14. The payment-card system of claim 5, wherein, after responding with the client-access token and prior to receiving the request for payment card information from the sandboxed payment-card client application, the operations performed by the payment-card system further comprise:

receiving a request from the web client for content for the sandboxed container object; and responding to the request by providing the web client with the sandboxed payment-card client application.

15. The non-transitory computer-readable medium of claim 9, wherein, after responding with the client-access token and prior to receiving the request for payment card information from the sandboxed payment-card client application, the method performed by the payment-card system further comprises:

receiving a request from the web client for content for the sandboxed container object; and responding to the request by providing the web client with the sandboxed payment-card client application.

* * * * *